United States Patent [19]

Echterhoff et al.

[11] 4,209,323

[45] Jun. 24, 1980

[54] PROCESS FOR THE PRODUCTION OF A PRODUCT WITH HIGH CARBON CONTENT FROM WASTE SOOT

[75] Inventors: Heinz Echterhoff; Wilfried Gemmeke, both of Essen; Karl H. Koch; Erich Raulf, both of Castrop-Rauxel; Joachim Sieckmann, Essen, all of Fed. Rep. of Germany

[73] Assignee: Verkaufsgesellschaft fur Teererzeugnisse, Essen, Fed. Rep. of Germany

[21] Appl. No.: 911,028

[22] Filed: May 31, 1978

[30] Foreign Application Priority Data

Jun. 10, 1977 [DE] Fed. Rep. of Germany ....... 2726268

[51] Int. Cl.² .............................................. C21C 7/00
[52] U.S. Cl. ...................................... 75/48; 264/29.5; 423/449
[58] Field of Search .................... 75/48; 423/445, 449; 264/29.1, 29.5

[56] References Cited

U.S. PATENT DOCUMENTS

| | | | |
|---|---|---|---|
| 2,530,459 | 11/1950 | Gilbert et al. | 75/48 |
| 4,031,189 | 6/1977 | Gemmeke et al. | 75/48 |

*Primary Examiner*—M. J. Andrews
*Attorney, Agent, or Firm*—Beveridge, DeGrandi, Kline & Lunsford

[57] ABSTRACT

Hydrous soot material containing a hydrocarbon is formed into molded articles which are then coked to form a high carbon content product.

13 Claims, No Drawings

PROCESS FOR THE PRODUCTION OF A PRODUCT WITH HIGH CARBON CONTENT FROM WASTE SOOT

BACKGROUND OF THE INVENTION

1. Filed of the Invention

The present invention relates to the production of a valuable coking product from waste hydrous soot material. There is a great demand for metallurgical coke which is a coke of sufficient strength and chemical purity for use as a carburizing agent in the iron and steel industry.

2. Description of the Prior Art

In the German OS No. 25 10 876 = U.S. Pat. No. 4,031,189 a process is disclosed for converting hydrous soot sludge into a high carbon content product containing slight amounts of ash, nitrogen and sulfur. According to this known process, the hydrous soot material is predried to a water content of from 5% to 20% and this predried soot is coked in a horizontal chamber furnace with addition of a compound to form a coke structure or frame. One disadvantage of this process is that the product, as a result of coking in the chamber furnace, is obtained as lump coke and for use in the iron and steel industry must first be comminuted and classified. In that case it cannot be avoided that a more or less large proportion is obtained as undersize grain, which is less suitable as a carburizing agent.

SUMMARY OF THE INVENTION

It is therefore a primary object of the present invention to provide a process for the production of a product having a high carbon content from waste soot which overcome the disadvantages of prior art processes.

It is another object of the present invention to provide such a process wherein a hydrous soot material is processed into a product directly suited for use as a carburizing agent in the iron and steel industry, especially for the production of high-grade steels.

Still further objects and the entire scope of applicability of the present invention will become apparent from the detailed description given hereinafter; it should be understood, however, that the detailed description and specific examples, while indicating preferred embodiments of the invention, are given by way of illustration only, since various change and modifications within the spirit and scope of the invention will become apparent to those skilled in the art therefrom.

It has been found that the above objects are attained by a process wherein a hydrocarbon containing hydrous soot material having a water content of from about 5% to about 20%, preferably from 8% to 12%, by weight, is formed into molded articles, e.g., into briquettes, and the molded articles are coked. If desired, depending on the hydrocarbon content of he hydrous soot material, from 0 to 25%, preferably from 5% to 15%, weight of an additive which forms a coke structure or frame is admixed with the soot material prior to forming the molded articles.

According to this process, a product is obtained from waste soot in a simple and economic manner, which is suitable directly as a carburizing agent, and also for case-hardening in the iron and steel industry, due to its low contents of ash (---% to 0.5%, pref. 0.1–0.5% e.g., 0.4%), nitrogen (----% up to 0.3%, pref. 0.1–0.3% e.g., 0.25%) and sulfur (----% up to 0.3%, pref. 0.1–0.3% e.g., 0.22%) and its favorable physical characteristics (high density, highly defined grain).

It is surprising that the required green strength of the molded articles, e.g., briquettes, is achieved without addition of the customary briquetting aids. It is particularly surprising that the binding capacity of the hydrocarbons normally present in the soot materials used is sufficient in order to bind the material and form the coke structure during shaping.

DESCRIPTION OF THE PREFERRED EMBODIMENTS

Soots with variable contents of hydrocarbon oils are obtained, for example, in various chemical process such as during cracking of crude oil-hydrocarbon fractions and gases for the production of unsaturated hydrocarbons and the refuse pyrolyses as a difficult to handle by-product. Depending on the process used, a part of the soot obtained may have a very high content of water. In that case it must be predried prior to use according to the present invention to a water content of from about 5% to about 20%, for example, according to the first step in the process of the German OS No. 25 10 876 reference. The hydrocarbon and water-containing soot material used as starting material for the process of the present invention may contain from about 10% to about 60% by weight hydrocarbons.

As stated above, depending on the hydrocarbon content of the hydrous soot material, it may be desirable to admix with the soot up to 25%, preferably from 5% to 15%, by weight of an additive which forms a coke structure. Such additives are known to the art as described in German OS No. 25 10 876. In the present invention, types of pitch of carbo or petro origin, with a softening point (according to Kraemer-Sarnow) of 40°–220°C., preferably of 80°–180°C., and especially of 110°–170°C. are preferred for use as an agent forming the coke structure.

The processing into molded articles may be accomplished by extruding or briquetting, and briquetting into edgeless briquettes is preferred generally. For the subsequent coking, preferably briquettes up to an average diameter of 50 mm, preferably from 1 to 30 mm and especially from 5 to 15 mm, are suitable. The coking may be accomplished at rest (for example, in a vertical or oblique chamber furnace or on a grate carbonizer) or in motion (for example, in a cylindrical rotary kiln or rotary roller hearth furnace), whereby continuously operating processes are preferred. The coking temperatures used are 900°–1500°C., preferably 950°–1200°C. The holding time depends on the size of the briquettes and the temperature used; generally it is from 20 minutes to 5 hours, preferably from 30 minutes to 2 hours.

In the following examples and throughout the specification and claims, all parts are parts by weight, and by all percents are percents by weight.

EXAMPLE 1

100 parts of soot material (44% hydrocarbons, 46% soot, 10% water) were mixed with 17.6 parts of bituminous coal tar pitch with a softening point of 160°C. (Kraemer-Sarnow) and compressed into ball shaped briquettes (grain size 10 mm) and were subsequently coked in a cylindrical rotary kiln at 1000°C. for a holding time of 2 hours. A coke with the following data after analysis was obtained: ash, 0.4%; volatile components, 0.5%; N, 0.12%; and S, 0.13%. The yield of coke amounted to 59.5%. The coke obtained may be used directly as a carburizing agent.

EXAMPLE 2

100 parts of soot material (49.5% hydrocarbons, 40.5% soot, 10% water) were compressed into briquettes having a grain size of 15 mm on a briquetting press and were subsequently coked in a cylindrical rotary kiln at 1000°C. The holding time was 1.5 hours and the yield of coke was 65.1% with data after analysis: ash, 0.4%; volatile components, 0.5%; N, 0.7%; and S, 0.15%.

What is claimed is:

1. A process for the production of a product having a high carbon content from waste soot which comprises forming a molded article from a material consisting of a hydrous soot material which contains a hydrous carbon and has a water content of from about 5% to about 20% by weight and from 0 to 25% by weight of an agent which forms a coke structure or frame, and coking the mold article.

2. The process according to claim 1 wherein the hydrous soot material has a water content of from about 8% to 12% by weight.

3. The process according to claim 1 wherein the molded article is formed from said hydrous soot material and from 5% to 15% by weight of said agent which forms a coke structure or frame.

4. The process according to claim 1 wherein the agent which forms a coke structure or frame is a pitch of carbo or petro origin.

5. The process according to claim 4 wherein the pitch of carbo or petro origin has a softening point of 40°–220°C.

6. The process according to claim 4 wherein the pitch of carbo or petro origin has a softening point of 110°–170°C.

7. The process according to claim 1 wherein the soot material, together with the material which forms a coke structure or frame, when used, is pressed into briquettes having an average diameter of 1–30 mm.

8. The process according to claim 1 wherein the soot material, together with the material which forms a coke structure or frame, when used, is pressed into briquettes having an average diameter of 5–15 mm.

9. The process according to claim 1 wherein the molded article is coked at a temperature of 900°–1500°C.

10. The process according to claim 1 wherein the molded article is coked at a temperature of 950°–1200°C.

11. The process according to claim 1 wherein the molded articles are coked in a cylindrical rotary kiln or rotary roller hearth furnace.

12. A product with a high carbon content produced according to the process of claim 1.

13. Process for carburizing iron or steel comprising adding to molten iron or steel a composition comprising a product according to claim 12.

* * * * *